United States Patent
Park et al.

(10) Patent No.: US 9,607,211 B2
(45) Date of Patent: Mar. 28, 2017

(54) FACE RECOGNITION APPARATUS, SYSTEM AND METHOD FOR MANAGING USERS BASED ON USER GROUPING

(71) Applicant: SUPREMA INC., Seongnam-si (KR)

(72) Inventors: Bo Gun Park, Seongnam-si (KR); Ki Deok Lee, Seongnam-si (KR); Ho Chul Shin, Seongnam-si (KR); Bong Seop Song, Seongnam-si (KR); Jae Won Lee, Seongnam-si (KR)

(73) Assignee: SUPREMA INC., Gyeonggi-Do (KR)

( * ) Notice: Subject to any disclaimer, the term of this patent is extended or adjusted under 35 U.S.C. 154(b) by 47 days.

(21) Appl. No.: 14/140,335

(22) Filed: Dec. 24, 2013

(65) Prior Publication Data
US 2014/0254892 A1    Sep. 11, 2014

(30) Foreign Application Priority Data
Mar. 6, 2013 (KR) .......... 10-2013-0024071

(51) Int. Cl.
*G06K 9/00* (2006.01)

(52) U.S. Cl.
CPC ..... *G06K 9/00288* (2013.01); *G06K 9/00677* (2013.01); *G06K 2009/00328* (2013.01)

(58) Field of Classification Search
None
See application file for complete search history.

(56) References Cited

U.S. PATENT DOCUMENTS

| | | | |
|---|---|---|---|
| 7,114,079 B1* | 9/2006 | Cook et al. | 713/186 |
| 8,559,684 B1* | 10/2013 | Nechyba | G06K 9/00926 382/118 |
| 2005/0114382 A1* | 5/2005 | Lakshminarayan | G06K 9/6218 |
| 2006/0204058 A1* | 9/2006 | Kim et al. | 382/118 |
| 2010/0226584 A1* | 9/2010 | Weng | G06K 9/00221 382/225 |

OTHER PUBLICATIONS

Pang, Shaoning, Daijin Kim, and Sung Yang Bang. "Membership authentication in the dynamic group by face classification using SVM ensemble." Pattern Recognition Letters 24.1 (2003): 215-225. 11 pages.*

Pang, Shaoning, Daijin Kim, and Sung Yang Bang. "Face membership authentication using SVM classification tree generated by membership-based LLE data partition." Neural Networks, IEEE Transactions on 16.2 (2005): 436-446. 11 pages.*

* cited by examiner

*Primary Examiner* — Sumati Lefkowitz
*Assistant Examiner* — Ryan P Potts
(74) *Attorney, Agent, or Firm* — Ladas & Parry, LLP

(57) ABSTRACT

A face recognition apparatus comprising: a database that stores face information mapped to each corresponding user; a face recognition unit configured to recognize the face information of a user; a user management unit configured to classify the face information into groups of the users of which the face information is not similar between one another so that the users having the similar face information does not fall within the same groups to store the classified face information in the database.

6 Claims, 3 Drawing Sheets

FIRST GROUP   SECOND GROUP

GROUPED USER DB

FACE RECOGNITION APPARATUS, SYSTEM AND METHOD FOR MANAGING USERS BASED ON USER GROUPING

RELATED APPLICATIONS

This application claims the benefit of Korean Patent Application No. 10-2013-0024071, filed on Mar. 6, 2013, which is hereby incorporated by reference in its entirety (as if fully set forth herein).

FIELD OF THE INVENTION

The present invention relates to a security authentication technology, and more particularly, to a technology for face recognition and data management.

BACKGROUND OF THE INVENTION

Biometric techniques following fingerprint recognition techniques are proposed in an access control, attendance management, building integrated system, automatic teller machine, computer security field, e-commerce authentication, airport information system, and the like. Among other things, face recognition is a technique to recognize persons using face information having unique characteristics.

A typical face recognition system stores face information or the like of users who are registered in the form of a database and authenticates a user by comparing to pre-stored user information when the user tries to authenticate him/her. An authentication system using the biometric inclusive of the face recognition system shows a higher probability of recognition error as the registered users increase.

SUMMARY OF THE INVENTION

In view of the above, the present invention provides a face recognition apparatus, system and method for managing users based on a user grouping in order to raise authentication performance and processing speed of the users who have similar face information when authenticating the users based on face recognition.

In accordance with an embodiment of the present invention, there is provided a face recognition apparatus comprising: a database that stores face information mapped to each corresponding user; a face recognition unit configured to recognize the face information of a user; a user management unit configured to classify the face information into groups of the users of which the face information is not similar one another so that the users having the similar face information does not fall within the same groups to store the classified face information in the database.

In the embodiment, wherein the user management unit is further configured to register a new user in the database, the user management unit performing to calculate the similarity to the users in the respective groups stored in the database in advance based on the face recognition by the face recognition unit, calculates a maximum value of the similarity in a group for each group and registers the new user in a group having a minimum value of similarity among the calculated maximum values of similarity.

In the embodiment, wherein the user management unit is further configured to newly add a new group when the minimum value is above a preset value and register the new user in the new group.

In the embodiment, the apparatus further comprising an image acquisition unit configured to acquire an image of the user, wherein the face recognition unit is further configured to extract the face information from the image acquired by the image acquisition unit; search the database for a user having the extracted face information within a group related to the extracted face information; and authenticate the user based on the search result.

In the embodiment, wherein the user management unit is configured to assign group identifier information to the classified groups.

In the embodiment, the apparatus further comprising an input and output unit configured to provide the group identifier information to the users and receives the group identifier information from each of the users when the user is subjected to the face recognition, wherein the face recognition unit is configured to recognize the group to which the user belongs based on the group identifier information and authenticate the user within the recognized group.

In accordance with another aspect of the present invention, there is provided a face recognition system comprising: a face recognition apparatus configured to recognize the face information of the users, classify the face information into groups of the users of which the face information is not similar one another so that the users having the similar face information does not fall within the same groups to store the classified face information in a database, and assign group identifier information to the respective classified groups; and a security medium that stores the group identifier information that is assigned by the face recognition apparatus, wherein the face recognition apparatus is further configured to reads out the group identifier information that is stored in the security medium, recognizes the group to which the user belongs, and authenticate the user within the recognized group.

As set forth above, in accordance with an embodiment of the present invention, it is possible to raise authentication performance of the users having similar face information by automatically classifying the users into groups in which the users are can be distinguished to manage the users and authenticating the users based on the classified groups when performing the user authentication based on the face recognition.

Furthermore, identifiers are assigned to the classified groups so as to recognize to which group the recognized face of the user belongs, and thus the recognized face of the user is compared to only the face information within the recognized group. Accordingly, it is possible to raise authentication processing speed as well as the authentication performance at the same time.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Hereinafter, the embodiments of the present invention will be described in detail with reference to the accompanying drawings. In the following description, well-known functions or constitutions will not be described in detail if they would unnecessarily obscure the gist of the embodiments of the invention. Further, the terminologies to be described across the specification are defined in consideration of their functionality and may vary depending on a user's or operator's intention or practice. Accordingly, the definition of the terminologies may be made on a basis of the content throughout the specification.

Figure 1:
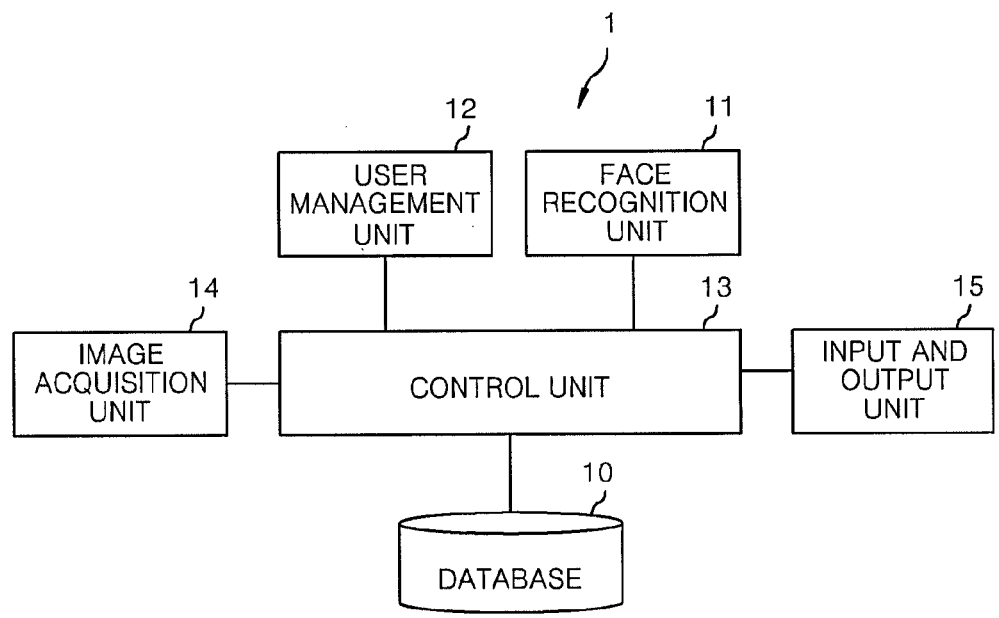
FIG. 1 is a configuration diagram of a face recognition apparatus in accordance with an embodiment of the present invention.

FIG. 1 is a configuration diagram of a face recognition apparatus 1 in accordance with an embodiment of the present invention.

Referring to FIG. 1, the face recognition apparatus 1 includes a database 10, a face recognition unit 11, a user management unit 12 and a control unit 13. The face recognition apparatus also includes an image acquisition unit 14 and an input and output unit 15.

In accordance with an embodiment of the present invention, when performing a user authentication based on a face recognition, in order to raise authentication performance and processing speed, the embodiment of the present invention proposes a technique which automatically classifies the users into groups in which the users can be distinguished one another to manage the groups and authenticates the users based on the classified groups. Hereinafter, the operation of the respective components of the face recognition apparatus will be described in detail below.

The database 10 serves to store face information mapped to each user. The face information of the user may be stored in the form of a mapping table in which they are mapped to their corresponding users. In accordance with an embodiment of the present invention, the database 10 stores the face information of the users that are classified into several groups. In this regard, the face information is classified into groups of the users of which the face information is not similar one another so that the users having the similar face information does not belong within the same group. For example, when a first user and a second user have similar face information each other, they will belong to different groups with each other. It is intended to avoid the situation where user authentication cannot be achieved due to the difficult of comparison of the face information of the user to those of other users having similar face information to the user when the user tries to authenticate later.

The face recognition unit 11 recognizes the face of the user who tries to authenticate, compares the recognized face to the face information of users stored in the database 10, and authenticates the user in accordance with whether the comparison is matched or not.

The user management unit 12 classifies the face information into groups of the users of which the face information is not similar one another so that the users having the similar face information does not fall within the same group through the use of similarity between the face information of the users who are recognized by the face recognition unit 11. For example, when a first user has similar face information to the second user, the user management unit 12 groups the first and second users so that the first user is classified into a first group and the second user is classified into a second group. Such a grouping may be implemented by any kind of existing or methods. Among of them, for example, the unsupervised classification method may be employed, which is a method to sort images by only wavelength or spatial property thereof without any prior information such as sample data. This method is also so called a clustering, which requires minimum input data and allows a computing device to spontaneously select the mean and covariance of classes to be used in the classification. Representation methods of the clustering may be a K-means algorithm, ISODATA algorithm and the like.

The user management unit 12 registers new users in the database 10. The user management unit 12 calculates the similarity to the users in the respective groups stored the database 10 in advance based on the face recognition by the face recognition unit 11, selects maximum similarities in the respective for each group and registers the new user in a group having a minimum similarity among the calculated maximum similarities. During the calculation, when the minimum similarity is above a preset value, the user management unit 12 may newly add a new group and register the new user in the newly added group.

Further, the similarity measurement between face information of the users performed by the user management unit 12 may be used by any existing method and new methods in the future. Among of them, for example, a method may be employed in which the face recognition unit 11 analyzes a face of a user and extracts feature information of the face, and the user management unit 12 compares the extracted feature information to pre-stored feature information to calculate the degree of similarity therebetween. The degree of similarity may be quantified, for example, such as similarity 90%, etc. The calculation function of the similarity between the face information can be carried out by the user management unit 12, or otherwise can be carried by the face recognition unit 11.

In accordance with an embodiment of the present invention, the user management unit 12 assigns information on group identifiers for each group to the classified groups. The assignment of the group identifiers enables to identify to which group the recognized face belongs, when the user authentication using the face recognition is performed by the face recognition unit 11.

The control unit 13 is responsible for controlling overall operations of the respective components in the face recognition apparatus 1 of FIG. 1. The image acquisition unit 14 acquires an image of the user. The image acquisition unit may be implemented by any devices which are capable of acquiring images such as cameras. The face recognition unit 11 extracts the face information from the image acquired by the image acquisition unit 14, searches the database 10 for a user having the extracted face information within a group related to the extracted face information, and authenticates the user based on the search result.

In accordance with an embodiment of the present invention, when performing the user authentication based on the face recognition, the face recognition unit 11 detects the user within a group related to the extracted face information acquired by the image acquisition unit 14 from among a plurality of groups.

To do it, the user management unit 12 has assigned the information on the group identifiers to the classified groups in advance. The input and output unit 15 provides the information on the group identifiers assigned by the user management unit 12 to the respective user. Thereafter, the input and output unit 15 receives the information on the group identifier from the user when carrying out the face recognition of the user. The face recognition unit 11 then recognizes the group to which the user belongs based on the information on the group identifier and performs the face recognition on the user within the recognized group.

In accordance with another embodiment of the present invention, the face recognition unit 11 may recognize the group to which the user belongs based on the information on the group identifier that has been stored in a security medium in advance and then perform the face recognition on the user within the recognized group. The security medium may be, for example, a security card. In this case, the user has no information on his/her group identifier, which leads to an improved security. The storage of the group identifier into the security medium may be achieved by an administrator.

When the face recognition unit 11 recognizes to which group the face of the user that is recognized by the aforementioned methods belongs, it just compares the recognized face of the user to the face information in the recognized group, thereby raising the processing speed and authentication performance at the same time.

In fact, the face recognition and the similarity measurement performed by the face recognition unit 11 are not the scope of the present invention. However, to briefly explain the face recognition process to help understand the present invention, the face recognition unit 11 detects a face area including a face of a user from images using the face recognition algorithm. The face recognition algorithm may include any existing method and new methods in the future. As an example, the face recognition unit 11 detects edge information (contour) from the distribution of the luminance signals in the image, and recognizes the face area depending on whether the contour of a face and the components such as an eye, nose, mouth, etc. are detected through the comparison to a shape model.

Furthermore, the face recognition unit 11 may extract feature information of the user from the detected face area. The user-specific feature information refers to information of the respective users. For example, the face recognition unit 11 may extract unique feature information for each user from the detected face area. The feature information may be extracted from the detected image using any one of quantified information in which some components of the face such as eye or nose has been mathematically converted and measured, brightness information and color information, but is not limited thereto. The face recognition unit 11 may be implemented by a dedicated CPU or program embedded in the CPU.

Figure 2:
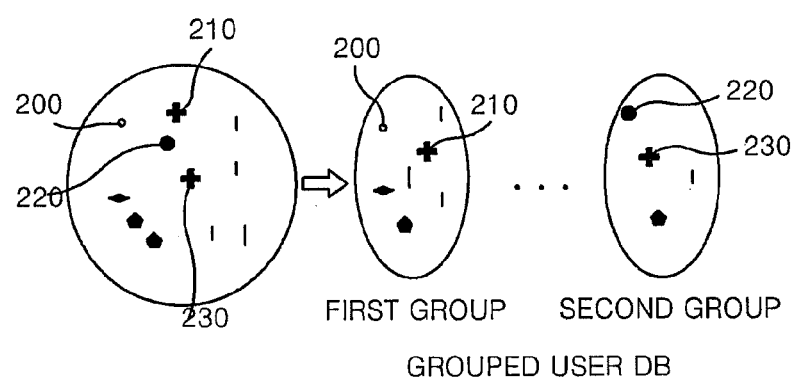
FIG. 2 is a reference diagram to help understand the user grouping by the user management unit shown in FIG. 1 in accordance with an embodiment of the present invention.

FIG. 2 is a reference diagram to help understand the user grouping by the user management unit 12 shown in FIG. 1 in accordance with an embodiment of the present invention.

Referring to FIG. 2, in the case where a first user 200—a third user 220 and a second user 210—a fourth user 230 are pairs of similar face users, they are grouped so that they don't belong to the same groups. For example, the first user 200 and second user 210 are classified into a first group, and the third user 220 and four user 230 are classified into a second group.

Figure 3:
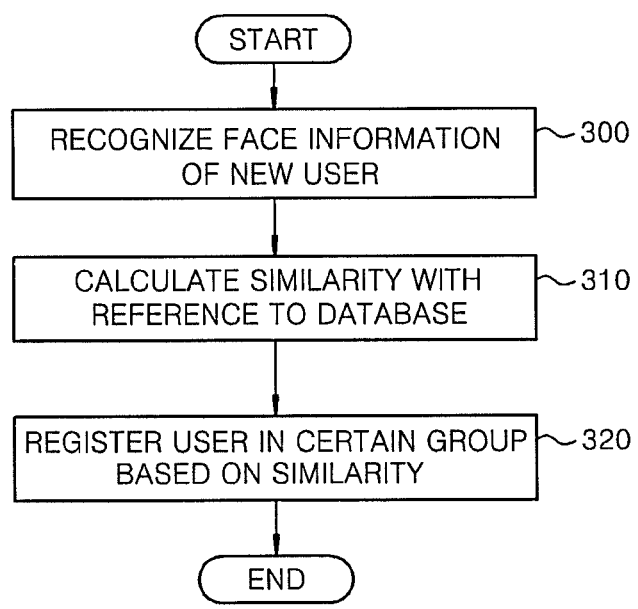
FIG. 3 is a flowchart illustrating a method of registering a new user in accordance with an embodiment of the present invention.

FIG. 3 is a flowchart illustrating a method of registering a new user in accordance with an embodiment of the present invention.

Referring to FIGS. 1 and 3, the face recognition apparatus 1 recognizes the face information of the user who will be registered newly, in block 300. The face recognition apparatus 1 calculates the similarity between the recognized face information and the other users in each group stored in the database 10, in block 310. The face recognition apparatus 1 selects a maximum value of the similarity in each group for each group.

After that, the face recognition apparatus 1 registers the user in a certain group based on the calculated similarity, in block 320. For example, the face recognition apparatus 1 may register the user in a group which has a minimum value from the selected maximum values. If the minimum value is above a preset value, a new group may be newly added and the user may be registered in the new group.

Figure 4:
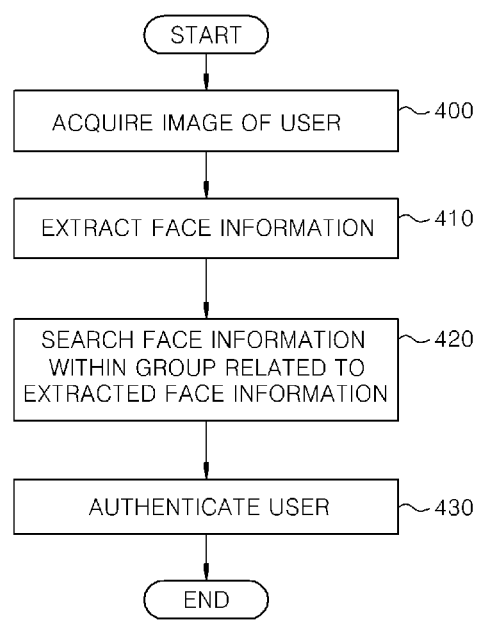
FIG. 4 is a flowchart illustrating a user authentication method based on face recognition in accordance with an embodiment of the present invention.

FIG. 4 is a flowchart illustrating a user authentication method based on face recognition in accordance with an embodiment of the present invention.

Referring to FIGS. 1 and 4, the face recognition apparatus 1 acquires a user image from the user (in block 400) and extracts the face information of the user from the acquired image (in block 410). The face recognition apparatus 1 searches the database 10 for a user having the extracted face information within a group related to the extracted face information (in block 420), and authenticates the user based on the search result (in block 430).

In accordance with an embodiment of the present invention, the face recognition apparatus 1 provides the identification information of the classified groups to the relevant users, and receives the group identification information, which had provided to the users, from the respective users when performing the face recognition of the respective users. The face recognition apparatus 1 may then recognize the group to which the user belongs based on the received group identifier information and performs the face recognition on the user within the recognized group. Alternatively, the face recognition apparatus 1 may recognize the group to which the user belongs based on the information on the group identifier that has been stored in a security medium in advance and then carries out the face recognition on the user within the recognized group.

Figure 5:
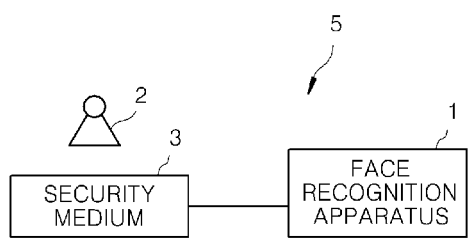
FIG. 5 is a configuration diagram of a face recognition system in accordance with an embodiment of the present invention.

FIG. 5 is a configuration diagram of a face recognition system 5 in accordance with an embodiment of the present invention.

Referring to FIG. 5, the face recognition system 5 includes the face recognition apparatus 1 and a security medium 3.

As mentioned above with reference to FIG. 1, the face recognition apparatus 1 recognizes the face information of the users, classifies the face information into groups of the users of which the face information is not similar one another based on the similarity between the face information of the recognized users so that the users having the similar face information does not fall within the same groups, and stores the classified users in the database. Further, the face recognition apparatus 1 assigns information on group identifier for each group to the classified groups.

The security medium 3 is used as a medium that is handheld by the user who wants to authenticate, which may be, for example, different cards, chips, electronic devices, etc. The security medium 3 stores the information on the group identifier that is assigned by the face recognition apparatus 1. To do it, the administrator saves the group identifier information, which is assigned by the face recognition apparatus 1, into the security medium or saves it through the use of a communication means.

Hereinafter, a description will be made on the process performed by the face recognition system of authenticating a user 2 using the security medium 5 through the face recognition apparatus 1. First, the user 2 touches the security medium 3, e.g., a security card with the face recognition apparatus 1 in front of the face recognition apparatus 1. The face recognition apparatus 1 recognizes the face of the user 2, reads out the information on the group identifier that is stored in the security medium 3, and recognizes the group to which the user belongs. Next, the face information that matches the face information of the user is searched in the recognized group. If the match is positive as the search result, it is determined that the user is identified as himself/herself. If the match is negative, it is determined that the user is not identified as himself/herself, and the determination result is presented.

As set forth above, the present invention has been investigated for the embodiments. It will be understood by those skilled in the art that the embodiments of the present invention may be implemented in the modified form within the scope without departing from the essential features of the invention. Therefore, the disclosed embodiments need to be considered as a descriptive sense instead of not a limited sense. Therefore, the scope of the present invention should be construed as defined in the following claims rather than the aforementioned description, and all of changes and modifications that fall within equivalents are intended to be embraced by the scope of the claims of the present invention.

What is claimed is:

1. A face recognition apparatus comprising:
a database that stores face information mapped to users;
a face recognition unit comprising a program running on a central processing unit (CPU) configured to recognize the face information of the users; and
a facial feature processor configured to
calculate a similarity value of the face information between the users, and
classify the users into a same group of at least two groups when the calculated similarity value is under a preset value or classify the users into different groups of the at least two groups when the calculated similarity value is above the preset value,
wherein the facial feature processor is further configured to register a new user in the database, the facial feature processor being configured to
calculate similarity values between face information of the new user obtained by the face recognition unit and the face information of the users stored in the database in each of the groups, respectively,
select maximum values of the calculated similarity values between the new user and the users for each of the groups, respectively, and
register the new user in a group having a smallest value among the selected maximum values of the similarity values.

2. The apparatus of claim 1, wherein the facial feature processor is further configured to create a new group and register the new user in the new group when the smallest value is above the preset value.

3. The apparatus of claim 1, further comprising an image acquisition unit configured to acquire images of the users,
wherein the face recognition unit is further configured to extract the face information from the images acquired by the image acquisition unit;
search the database for the users having the extracted face information within a group related to the extracted face information; and
authenticate the users based on the search result.

4. The apparatus of claim 1, wherein the facial feature processor is configured to assign group identifier information to the classified groups.

5. The apparatus of claim 4, further comprising an input and output unit configured to provide the group identifier information to the users and receives the group identifier information from each of the users when the users are subjected to face recognition,
wherein the face recognition unit is configured to recognize the group to which the users belong based on the group identifier information and authenticate the users within the recognized group.

6. A face recognition system comprising:
a face recognition apparatus comprising:
a database, a face recognition unit comprising a program running on a central processing unit (CPU) and a facial feature processor, the face recognition apparatus configured to recognize face information of users, calculate a similarity value of the face information between the users, classify the users into a same group of at least two groups when the calculated similarity value is under a preset value or classify the users into different groups of the at least two groups when the calculated similarity value is above the preset value, store the face information in the database, and assign group identifier information to each of the groups; and
a security storage medium that stores the group identifier information that is assigned by the face recognition apparatus,
wherein the face recognition apparatus is further configured to read out the group identifier information that is stored in the security storage medium, recognize the group to which its users belong, and authenticate the users within the recognized group;
wherein the facial feature processor is configured to register a new user in the database, the facial feature processor being configured to:
calculate similarity values between face information of the new user obtained by the face recognition unit and the face information of the users stored in the database in each of the groups, respectively,
select maximum values of the calculated similarity values between the new user and the users for each of the groups, respectively, and
register the new user in a group having a smallest value among the selected maximum values of the similarity values.

* * * * *